(12) United States Patent
Nuthalapati (10) Patent No.: US 8,416,118 B1
(45) Date of Patent: Apr. 9, 2013

(54) CHAFF CLOUD DETECTION AND CENTROID ESTIMATION

(75) Inventor: Rao M. Nuthalapati, Delran, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 265 days.

(21) Appl. No.: 12/718,562

(22) Filed: Mar. 5, 2010

(51) Int. Cl.
*H04K 3/00* (2006.01)
*G01S 7/40* (2006.01)
*G01S 13/04* (2006.01)
*G01S 13/00* (2006.01)

(52) U.S. Cl.
USPC ............ 342/13; 342/27; 342/89; 342/91; 342/165; 342/173; 342/175; 342/195

(58) Field of Classification Search .......... 342/13–20, 342/89, 91–93, 175, 195, 159–165, 173, 342/174, 27, 28, 90; 324/600, 629, 633, 324/636–646
See application file for complete search history.

(56) References Cited

U.S. PATENT DOCUMENTS

| | | | | |
|---|---|---|---|---|
| 3,706,993 A * | 12/1972 | Kuck | | 342/160 |
| 3,918,059 A * | 11/1975 | Adrian | | 342/16 |
| 3,938,145 A * | 2/1976 | Brook et al. | | 342/159 |
| 3,946,382 A * | 3/1976 | Kossiakoff et al. | | 342/93 |
| 3,958,241 A * | 5/1976 | Adrian | | 342/16 |
| 4,249,179 A * | 2/1981 | Kolacny | | 342/159 |
| 4,899,159 A | 2/1990 | Marchant | | |
| 5,808,579 A | 9/1998 | Rademacher | | |
| 7,034,549 B2 * | 4/2006 | Richardson et al. | | 324/636 |

\* cited by examiner

*Primary Examiner* — Bernarr Gregory
(74) *Attorney, Agent, or Firm* — Howard IP Law Group, PC (57) ABSTRACT

A method and system for detecting chaff is disclosed. The method includes receiving range profile data including a plurality of samples, determining an average power for a first group of samples of the range profile data and a second group of samples of the range profile data, comparing the average power for the first group of samples to a first threshold value and the average power for the second group of samples to a second threshold value, and identifying a chaff detection if an average power of at least one of the first and second groups of samples exceeds its respective threshold value. The system includes a computer readable medium and a processor in communication with the computer readable storage medium and configured to perform the receiving, determining, comparing and detecting steps.

20 Claims, 10 Drawing Sheets

CHAFF CLOUD DETECTION AND CENTROID ESTIMATION

STATEMENT REGARDING FEDERALLY SPONSORED RESEARCH OR DEVELOPMENT

This invention was made with Government Support under Contract No. N00024-03-C-6110 awarded by the Department of the Navy. The Government has certain rights in this invention.

FIELD OF DISCLOSURE

The disclosed system and method relate to radar. More specifically, the disclosed system and method relate to detecting a cloud of chaff and determining the centroid of the chaff cloud.

BACKGROUND

Chaff is a radar countermeasure in which aircraft or other targets spread a cloud of small, thin pieces of aluminum, metalized glass fiber, plastic, or the like to reduce the signal-to-interference ratio and reduce the probability of detecting a target. Like noise, chaff may be modeled as Gaussian distribution. However, chaff is usually distributed in a localized region of a search window and its variance is usually much higher than noise.

Radar systems typically utilize constant false alarm rate (CFAR) detection algorithms to detect target returns against a background of noise or other interference. For example, in cell averaging CFAR (CA-CFAR), a threshold level is calculated by calculating a noise floor around a cell under test (CUT). U.S. Pat. No. 5,808,579 issued to Rademacher discloses a radar system using a cell averaging constant false alarm rate device and is incorporated by reference herein in its entirety. However, CA-CFAR is not effective to determine the presence of chaff because of an increased threshold estimate caused by chaff contribution in the CFAR window.

Ordered statistic CFAR (OS-CFAR) is generally used to detect targets by avoiding distributed clutter. Therefore, OS-CFAR cannot be used for the detection of a chaff cloud since it ignores disturbed clutter.

Accordingly, a system and method for detecting a chaff cloud and estimating the centroid of the chaff cloud are desirable.

SUMMARY

A method of detecting chaff for a radar system is disclosed. The method includes receiving range profile data including a plurality of samples, determining an average power for a first group of samples of the range profile data and a second group of samples of the range profile data, comparing the average power for the first group of samples to a first threshold value and the average power for the second group of samples to a second threshold value, and identifying a chaff detection if an average power of at least one of the first and second groups of samples exceeds its respective threshold value. Embodiments are also disclosed in which a computer readable storage medium is encoded with computer program code such that when the computer program code is executed by a processor, the processor performs the method.

A system for detecting a chaff cloud is also disclosed. The system includes a computer readable storage medium and a processor in signal communication with the computer readable storage medium. The processor is configured to receive range profile data including a plurality of samples, determine an average power for first group of samples of the range profile data and a second group of samples of the range profile data, compare the average power for the first group of samples to a first threshold value and the average power for the second group of samples to a second threshold value, and detect the chaff cloud if an average power of at least one of the first and second groups of samples exceeds its respective threshold value.

Another method for identifying a chaff cloud is disclosed in which range profile data including a plurality of samples from a radar system is received. The range profile data are replicated to provide a plurality of range profile data sets. For each of the range profile data sets, the samples of the range profile data are divided into a plurality of groups in which each group of samples in a data set has an approximately equal number of samples per group. An average power of each of the sample groups is determined. The average power of each of the samples groups is compared to a threshold value. An initial detection of chaff is identified if the average power of a sample group exceeds the threshold value. A chaff cloud is identified if at least one of the range profile data sets identifies at least one initial detection of chaff.

DETAILED DESCRIPTION

A system and method are disclosed for detecting a chaff cloud and calculating the centroid of the chaff cloud in the event of a detection. The method of detection includes dividing range profile data into different block sizes for processing. Each block of data is averaged together and compared to a threshold, which is different for each of the different block sizes. If an average power for a group exceeds its respective threshold, then an initial detection is recorded. An M/N detection scheme may be used determine the presence of chaff if a number, M, of blocks report an initial detection out of the total number of blocks, N.

Figure 1:
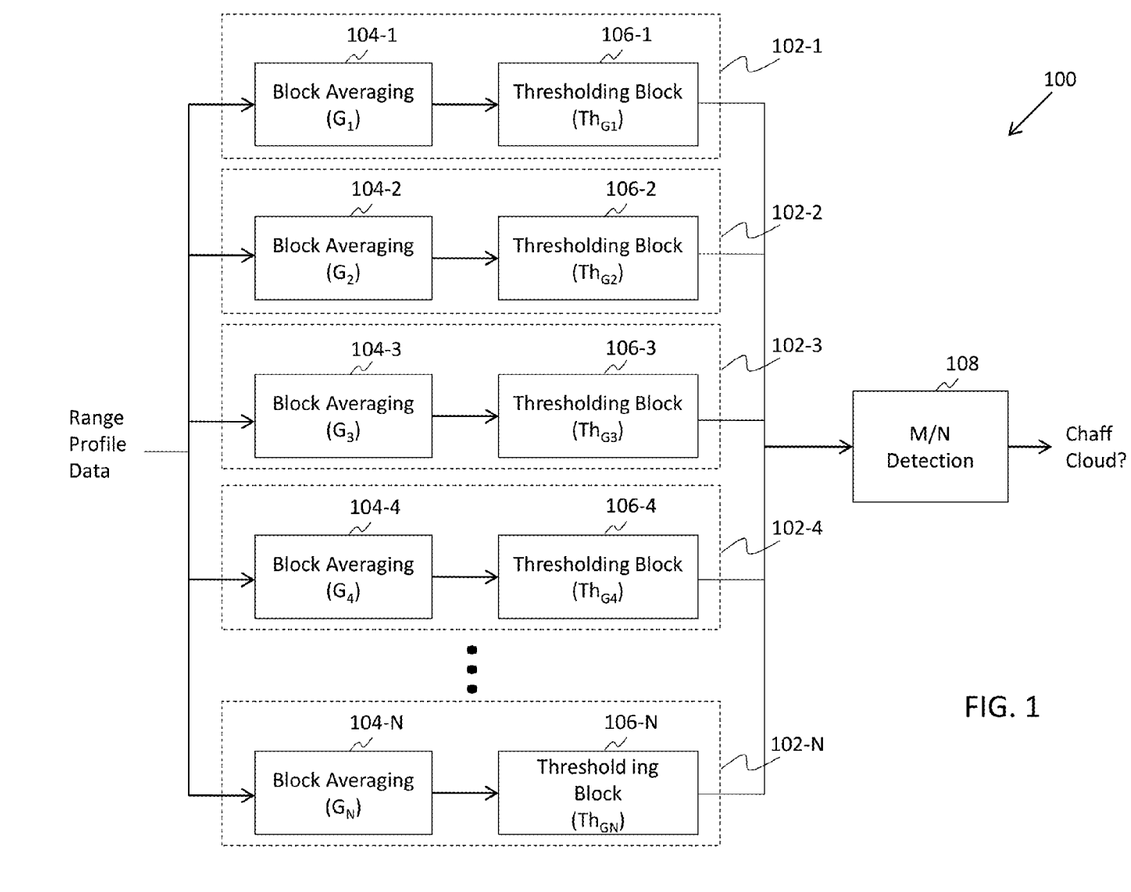
FIG. 1 is a block diagram of one example of a chaff detection processing channel.

FIG. 1 illustrates one example of a chaff detection processing channel 100. As shown in FIG. 1, range profile data, which may include a plurality of data samples, are distributed to a plurality of sub-processing channels 102-1:102-N (collectively referred to as "sub-processing channels 102") such that each sub-processing channel receives a copy of the range profile data. The total number, N, of sub-processing channels 102 may be varied as will be understood by one skilled in the art. Each of the sub-processing channels 102 includes a respective block averaging (BA) block 104-1:104-N (collectively referred to as "BA blocks 104") coupled to a respective thresholding block 106-1:106-N (collectively referred to as "thresholding blocks 106"). The output of the thresholding blocks 106 are received at an M/N processing block 108.

Figure 2A:
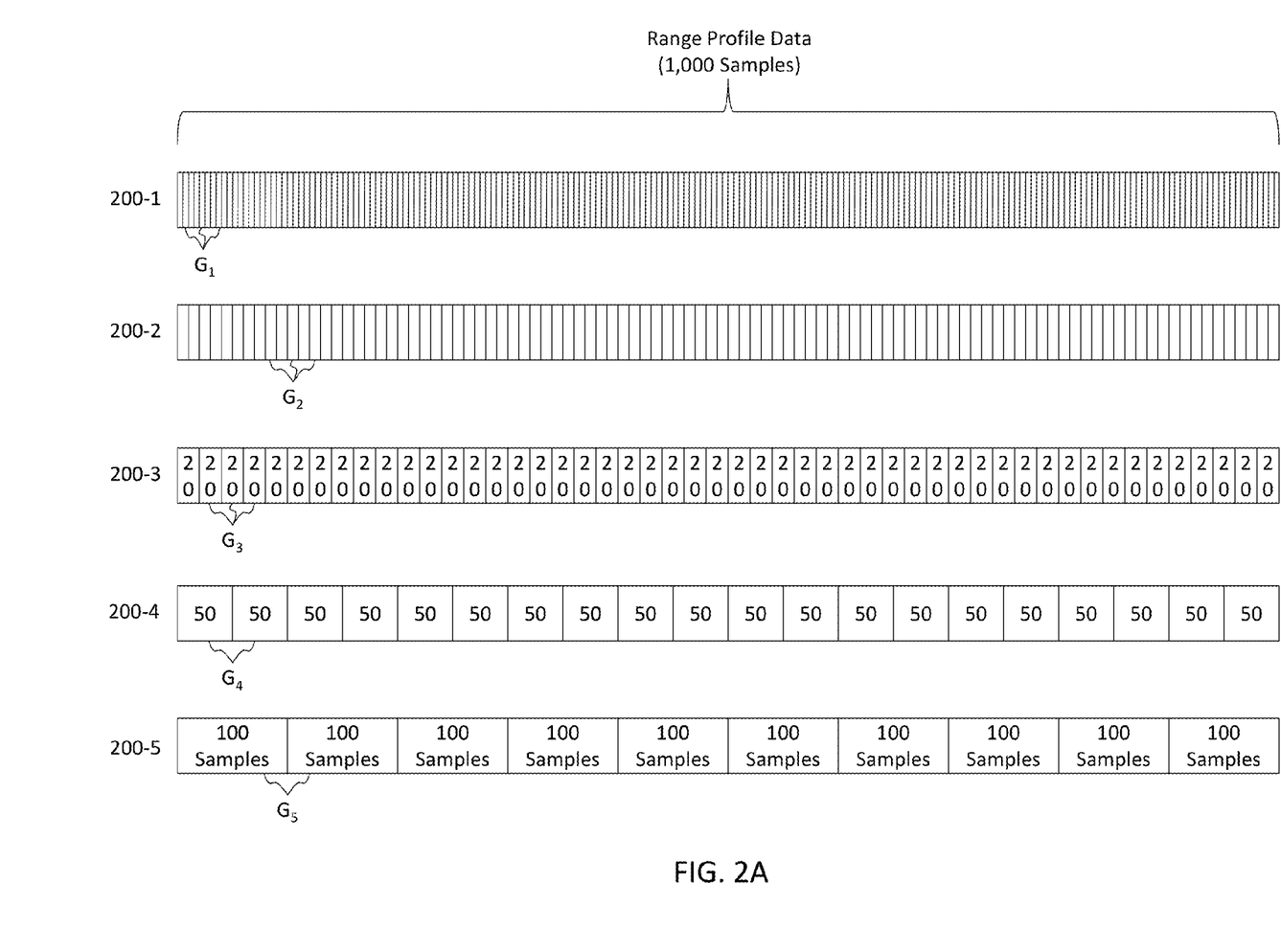
FIG. 2A illustrates an example of sets of range profile data divided into groups of different sample lengths.

Each of the BA blocks 104 may divide the range profile data into groups of samples of differing sizes. FIG. 2A illustrates an example of five sets of range profile data 200-1: 200-5 each including 1,000 samples divided into differently sized groups of samples. For example, the samples of the first set of range profile data 200-1 are divided into groups, $G_1$, of five samples; the samples of the second set of range profile data 200-2 are divided into groups, $G_2$, of 10 samples; the samples in the third set of range profile data 200-3 are divided into groups, $G_3$, of 20 samples; the samples in the fourth set of range profile data 200-4 are divided into groups, $G_4$, of 50 samples; and the samples of the fifth set of range profile data 200-5 are divided into groups, $G_5$, of 100 samples. One skilled in the art will understand that the number of samples in the range profile data may be greater or less than 1,000 and that the number of samples in a sample group may also be varied. Each of the BA blocks 104 may compute an average power (P) for each of the sample groups. For example, if the first BA block 102-1 divides the 1,000 samples into sample groups, $G_1$, of 5 samples per group as shown in FIG. 2A, then the average power for a group of samples may be computed as follows:

$$P_{G1} = \frac{S_1 + S_2 + S_3 + S_4 + S_5}{5}$$

Where,

S is the power for an individual sample.

Accordingly, BA block 104-1 may generate 200 separate power values, which are output to thresholding block 106-1. BA blocks 104-2:104-5 may compute the average power for each sample groups in a similar manner such that BA block 104-2 outputs 100 power values to thresholding block 106-2, BA block 104-3 outputs 50 power values to thresholding block 106-3, BA block 104-4 outputs 20 power values to thresholding block 106-4, and BA block 104-5 outputs 10 power values to thresholding block 106-5.

Each of the thresholding blocks 106 may compare the power values received from their respective BA blocks 104 to an independent threshold value. Independent thresholds may be implemented for each of the thresholding blocks 106 since the variance of each sample group is inversely proportional to the size of the sample group. Accordingly, the threshold setting for a larger samples, e.g., a sample group comprising 200 samples, is lower than a threshold setting for a smaller sample group, e.g., a sample group comprising 5 samples, to maintain comparable detection probabilities across the various sizes of sample groups.

The M/N detection block 108 may receive a signal from each of the thresholding blocks 106 identifying if an initial detection was identified in the respective thresholding block 106. The M/N detection block 108 may determine if chaff is present if a predetermined number, M, of the processing sub-channels 102 report an initial detection. For example, if M is set at 3 and there are five processing sub-channels 102 (N=5), then chaff will be detected if at least three of the processing sub-channels 102 report at least one initial detection, i.e., the average power for at least one sample group exceeds the threshold. If fewer than three sub-channels 102 report any detections, then chaff is not detected.

Figure 3:
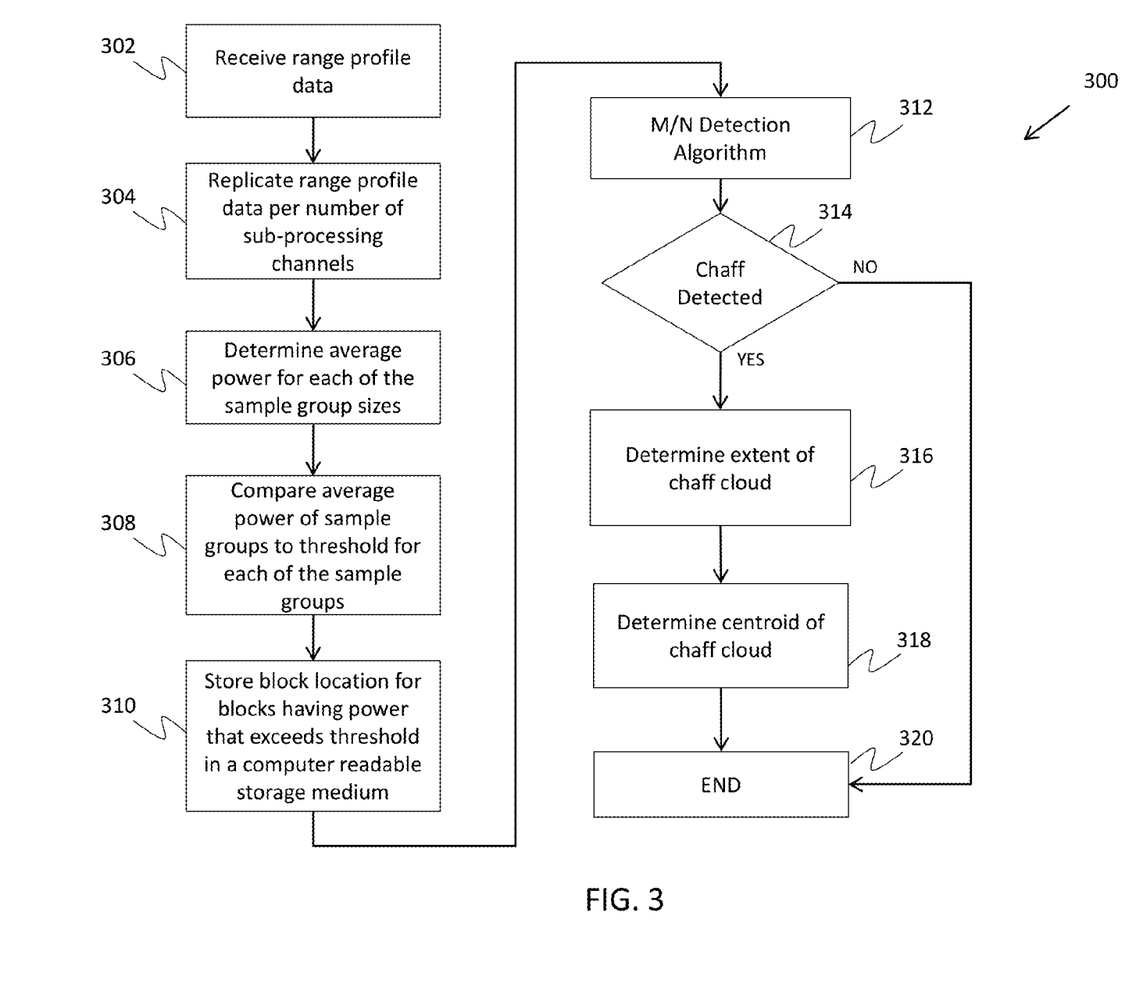
FIG. 3 is a flow diagram of one example of a method of detecting, locating, and determining the centroid of a chaff cloud.

FIG. 3 is a flow chart of one example of a method 300 of detecting chaff. As shown in FIG. 3, range profile data are received at block 302. As described above, the range profile data may include a plurality of samples received from a radar sensor at a computer.

At block 304, the range profile data are replicated to each of the plurality of processing sub-channels 102. For example, the range profile data may be replicated N times such that each of the N processing sub-channels 102 receives the same range profile data.

At block 306, the average power for each of the different sample groups are calculated. As described above, each of the BA blocks 104 in the separate processing sub-channels 102 may divide the samples of the range profile data into groups, with each BA block 104 grouping a different number of samples together. For example, the BA block 104-1 in one processing sub-channel 102-1 may divide the samples of the range profile data into one group of samples, $G_1$, the BA block 104-2 in another processing sub-channel 102-2 may divide the samples of the range profile data into another group of samples, $G_2$, and so on. Accordingly, the BA blocks 104 calculate the average power for each of the plurality of sample groups.

At block 308, the average power for each of the sample groups in a processing sub-channel 102 is compared to a respective threshold value (Th) for the processing sub-channel 102, which may have a different power threshold as described above. The threshold value may depend on the number of samples in a sample group such that a sample group having a large number of samples will have a lower threshold compared to a sample group having a smaller number samples.

At block 310, the average power of the sample groups along with the location or order of the sample group may be stored in a computer readable storage medium. If initial detections are determined to be in a plurality of processing sub-channels 102, the likelihood of the presence of a chaff cloud increases. For example, if a processing sub-channel 102 replicates samples into a group that is longer than the chaff cloud, variance estimates would be lower and detection may be missed. However, if the number of samples in a group is small compared to the extent of the chaff cloud, multiple contiguous detections may occur, which could help in the precise estimation of the chaff boundary.

At block 312, the results of the thresholding blocks 106 are output to the M/N block 108 to determine the presence of chaff. For example, each of the thresholding blocks 106 may output a logic one to the M/N detection block 108 if the average of at least one of the plurality of sample groups had an average power that exceeded the threshold value. One example of an M/N detection scheme and hardware implementation is disclosed in U.S. Pat. No. 4,899,159 issued to Marchant, which is incorporated by reference herein in its entirety. As described above, the M/N detection block 108 may determine the presence of chaff if a predetermined number, M, of the N processing sub-channels 102 report that at least one initial detection, i.e., the average power in at least one sample group exceeds the threshold value.

At decision block 314, a determination is made as to whether chaff has been detected. If chaff has not been detected, the method may proceed to block 320, which is the end of the method 300. However, if chaff has been detected, then the method may proceed to block 316.

Figure 2B:
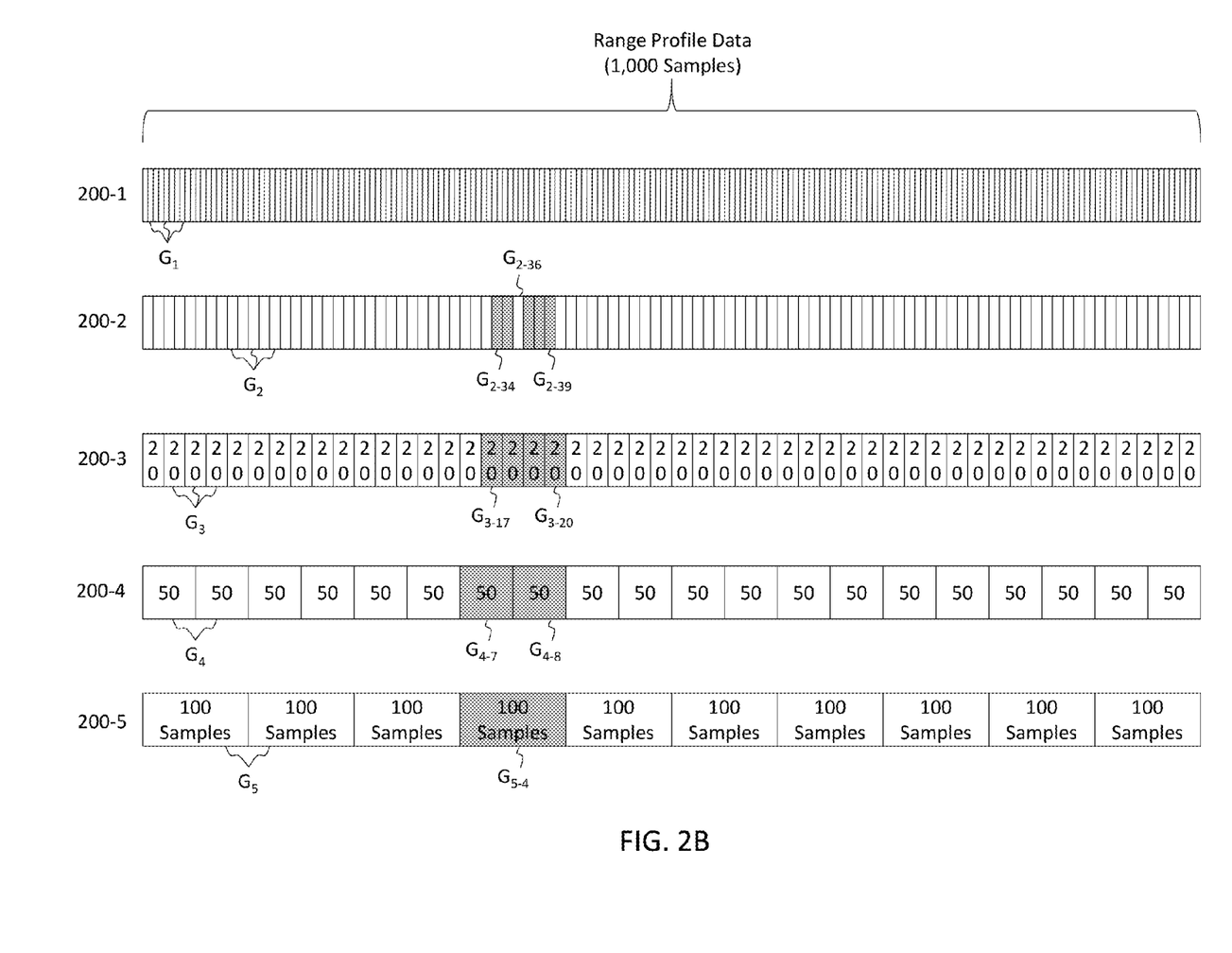
FIG. 2B illustrates detections in selected groups of different sample lengths.

At block 316, the extent of the chaff cloud is determined. The extent of the chaff cloud may be determined by identifying the first and last sample groups in the processing sub-channel 102 having the smallest sample group size for which an initial detection was identified. For example, FIG. 2B illustrates the five sets of range profile data 200-1:200-5 described above with respect to FIG. 2A with the shaded sample groups representing sample groups having an average power greater than or equal to the threshold power level. Put another way, the shaded sample groups represent sample groups where chaff was detected. In the example illustrated in FIG. 2B, the extent of the chaff is determined by taking the location of the first detection, $G_{2-34}$, and the location of the last detection, $G_{2-39}$, in the sub-processing channel 102 having the smallest sample group size for which an initial detection was registered, i.e., the sub-processing channel 102-2 that processed the second set of range profile data 200-2. The system 300 may be configured to ignore one or more sample groups failing to detect chaff, e.g., group $G_{2-36}$ in FIG. 2B. Accordingly, the extent of the chaff in FIG. 2B is 50 samples as the first and last sample groups recording in which an initial detection was recorded were five groups apart with each sample group including 10 samples. One skilled in the art will understand that each sample represents a certain distance and thus the precise location and extent of the chaff may be determined from the samples.

In some embodiments, system 300 may be configured to identify each instance of two or more contiguous samples groups in which the average power of the sample groups exceeded the threshold as a separate and distinct chaff clouds. For example, system 300 may identify two separate chaff clouds in the set of range profile data 200-2 in FIG. 2B, i.e., one chaff cloud comprising groups $G_{2-34}$ and $G_{2-35}$ and another chaff cloud comprising sample groups $G_{2-37}$, $G_{2-38}$, and $G_{2-39}$.

Determining the location and extent of the chaff using the processing sub-channel 102 having the smallest sample group size for which at least one initial detection is recorded enables the location and extent of the chaff to be more precisely determined than if larger sample groups were used. For example, if the set of range profile data 200-5 was used instead range profile data 200-2 to calculate the extent of the chaff, then the extent of the chaff would be determined to be 100 samples.

At block 318, the location of the centroid of the chaff cloud is determined. The centroid of the chaff cloud is determined by averaging the locations, e.g., calculating the midpoint, between the first and last sample groups for the set of range profile data having the smallest sample groups for which a detection was identified. For example, the centroid of the chaff cloud in FIG. 2B may be determined by determining the midpoint between sample group $G_{2-34}$ and $G_{2-39}$. Accordingly, one skilled in the art will understand that the centroid may be determined to be between sample groups $G_{2-36}$ and $G_{2-37}$, and more specifically, between samples 360 and 370 assuming that the first sample group is $G_{2-1}$ and begins at block 1 or sample 10. Additionally, one skilled in the art will understand that an exact location of the centroid may be determined by mapping the samples to an actual range or distance.

Figure 4:
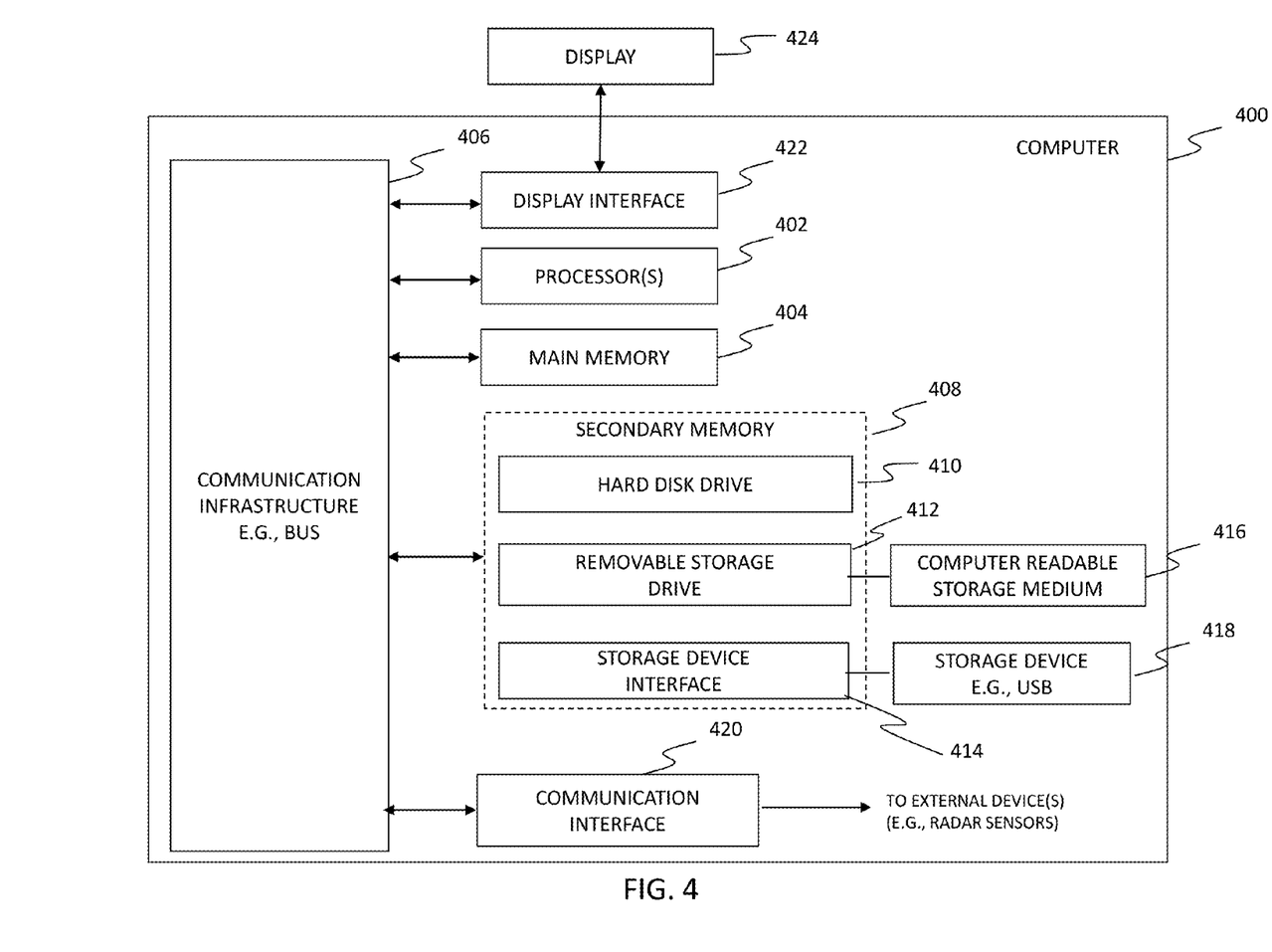
FIG. 4 is a block diagram of one example of a computer architecture.

The method described above may be implemented in a computer system. FIG. 4 is a block diagram of one example of an architecture of a computer 400. As shown in FIG. 4, computer system 400 may include one or more processors, such as processor(s) 402, which may be configured to run a multi-tasking operating system. The processor(s) 402 are connected to a communication infrastructure 406 (e.g., a communications bus, cross-over bar, or network). Various software embodiments are described in terms of this exemplary computer system. After reading this description, it will be apparent to one skilled in the art how to implement the method using other computer systems or architectures.

Computer system 400 can include a display interface 422 that forwards graphics, text, and other data from the communication infrastructure 406 (or from a frame buffer not shown) for display on a display unit 426.

Computer 400 may include a main memory 404, such as a random access (RAM) memory. Computer 400 may also include a secondary memory 408, which may be a more persistent memory than main memory 404. The secondary memory 408 may include, for example, a hard disk drive 410 and/or removable storage drive 412, representing a floppy disk drive, a magnetic tape drive, an optical disk drive, ZIP™ drive, or the like. The removable storage drive 412 reads from and/or writes to a removable computer readable storage unit 416 in a known manner. Removable computer readable storage unit 416 represents a floppy disk, magnetic tape, optical disk, ZIP™ disk, to name a few, which is read by and written to by removable storage drive 412. As will be appreciated, the removable computer readable storage unit 416 may have computer software and/or data stored therein.

In some embodiments, secondary memory 408 may include other similar devices for allowing computer programs or other instructions to be loaded into computer 400. Such device may include, for example a removable storage unit 418 and a corresponding interface 414. Examples of such a removable storage unit and interface may include a universal serial bus (USB) memory device and corresponding interface, e.g., a USB port.

Computer 400 may also include a communications interface 420, which allows software and data to be transferred between computer 400 and external devices, such as radar sensors or other remote computer terminals. Examples of communications interface 420 may include a modem, a network interface (such as an Ethernet card), a communications port, a Personal Computer Memory Card International Association (PCMCIA) slot and card, or the like. Software and data transferred via communications interface 420 are in the form of signals which may be electronic, electromagnetic, optical, or other signals capable of being received by communications interface 420. These signals are provided to communications interface 420 via a communications path (e.g., channel), which may be implemented using wire or cable, fiber optics, a telephone line, a cellular link, a radio frequency (RF) link and other communication channels.

In this document, the terms "computer program medium" and "computer readable storage medium" refer to media such as removable storage drive 412, a hard disk installed in hard disk drive 410, and signals. These computer program products provide software to computer 400. Computer programs (also referred to as computer control logic) are stored in main memory 404 and/or secondary memory 408. Computer programs may also be received via communications interface 420. Such computer programs, when executed by a processor 402, enable the computer 400 to perform the features of the method discussed herein.

In an embodiment where the disclosed method is implemented using software, the software may be stored in a computer readable storage medium, e.g., main memory 404 and/or secondary memory 408, and loaded into computer 400 using removable storage drive 412, hard drive 410, or communications interface 420. The software, when executed by a processor(s) 402, causes the processor(s) 02 to perform the functions of the method described herein. In another embodiment, the method is implemented primarily in hardware using, for example, hardware components such as application specific integrated circuits (ASICs). Implementation of the hardware state machine so as to perform the functions described herein will be apparent to persons skilled in the art. In yet another embodiment, the method is implemented using a combination of both hardware and software.

Example

Figure 5:
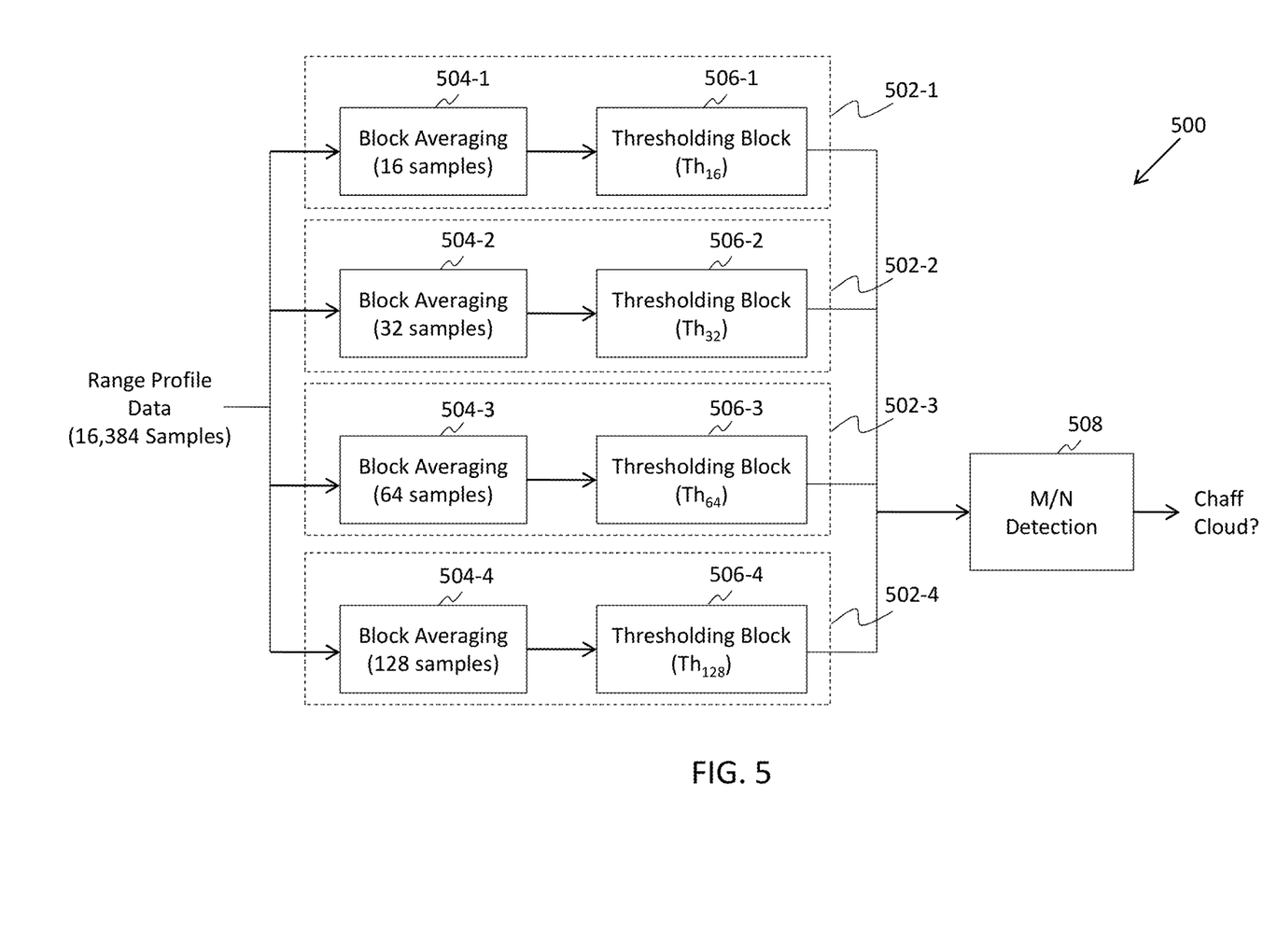
FIG. 5 is a block diagram of another example of a chaff detection processing channel.

FIG. 5 is a block diagram of a chaff detection processing channel 500 for which simulations were performed. As shown in FIG. 5, the processing channel 500 includes four sub-processing channels (N=4) each receiving a set of range profile data comprising 16,384 samples. BA block 504-1 of processing sub-channel 502-1 was configured to compute an average power for a sample group comprising 16 samples; BA block 504-2 of processing sub-channel 502-2 was configured to compute an average power for a sample group comprising 32 samples; BA block 504-3 of processing sub-channel 502-3 was configured to compute the average power for a sample group comprising 64 samples; and BA block 504-4 of processing sub-channel 502-4 was configured to compute the average power for a sample group comprising 128 samples. Ten thousand Monte Carlo simulation runs were performed having the parameters listed in Table 1.

TABLE 1

| | |
|---|---|
| Chaff Cloud Extent (range samples) | 10-200 |
| Chaff-to-Noise Ratio (dB) | 5 |
| Noise Type | Gaussian |
| Chaff Type | Gaussian |
| Chaff Cloud Range Extent Distribution | Uniform |
| Chaff Cloud Placement in Window | Uniform |
| Threshold ($Th_{16}$) | 2.7 |
| Threshold ($Th_{32}$) | 2.2 |
| Threshold ($Th_{64}$) | 1.7 |
| Threshold ($Th_{128}$) | 1.5 |

Figure 6:
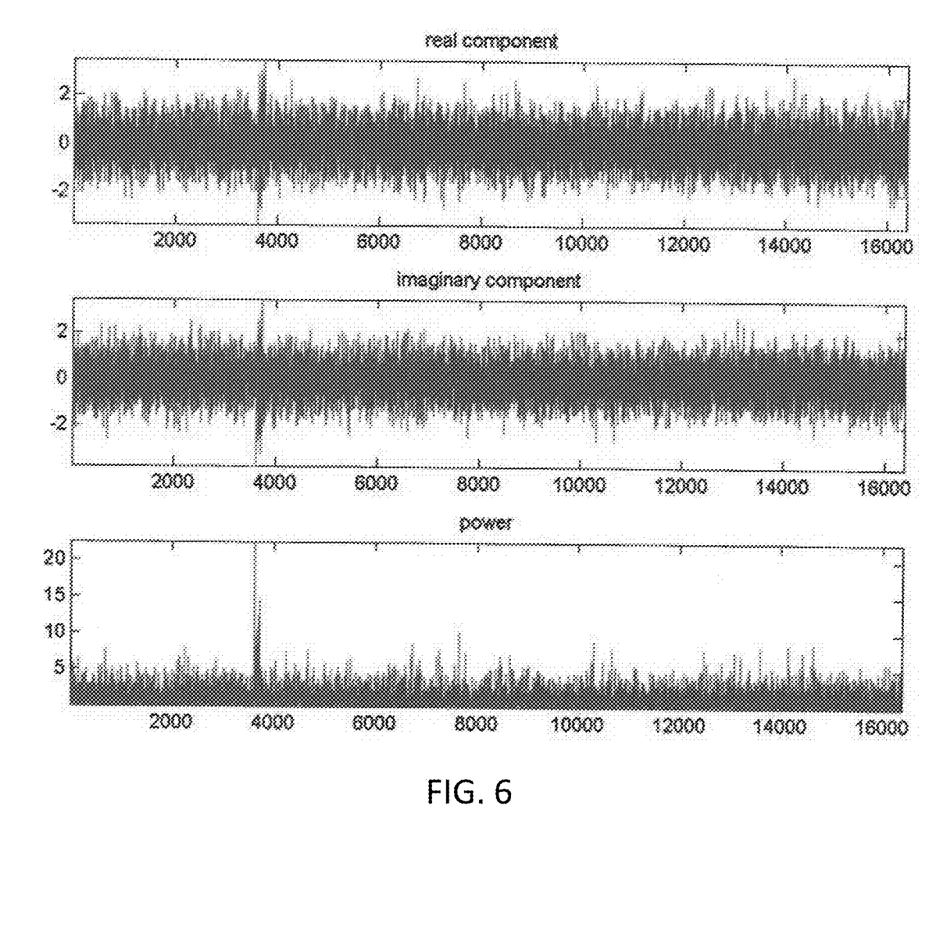
FIG. 6 is a power versus sample graph for combined chaff and noise data for a simulation.

FIG. 6 illustrates combined chaff and noise data for 16384 samples for one of the simulation runs. As shown in FIG. 6, the chaff cloud range extent is approximately 120 samples at an offset of about the $3620^{th}$ sample. The Gaussian distributed real (I) and imaginary (Q) components with zero mean and unit variance are respectively shown in the top and middle subplots of FIG. 6. The bottom subplot in FIG. 6 shows the power profile of data that follow an exponential distribution.

Figure 7:
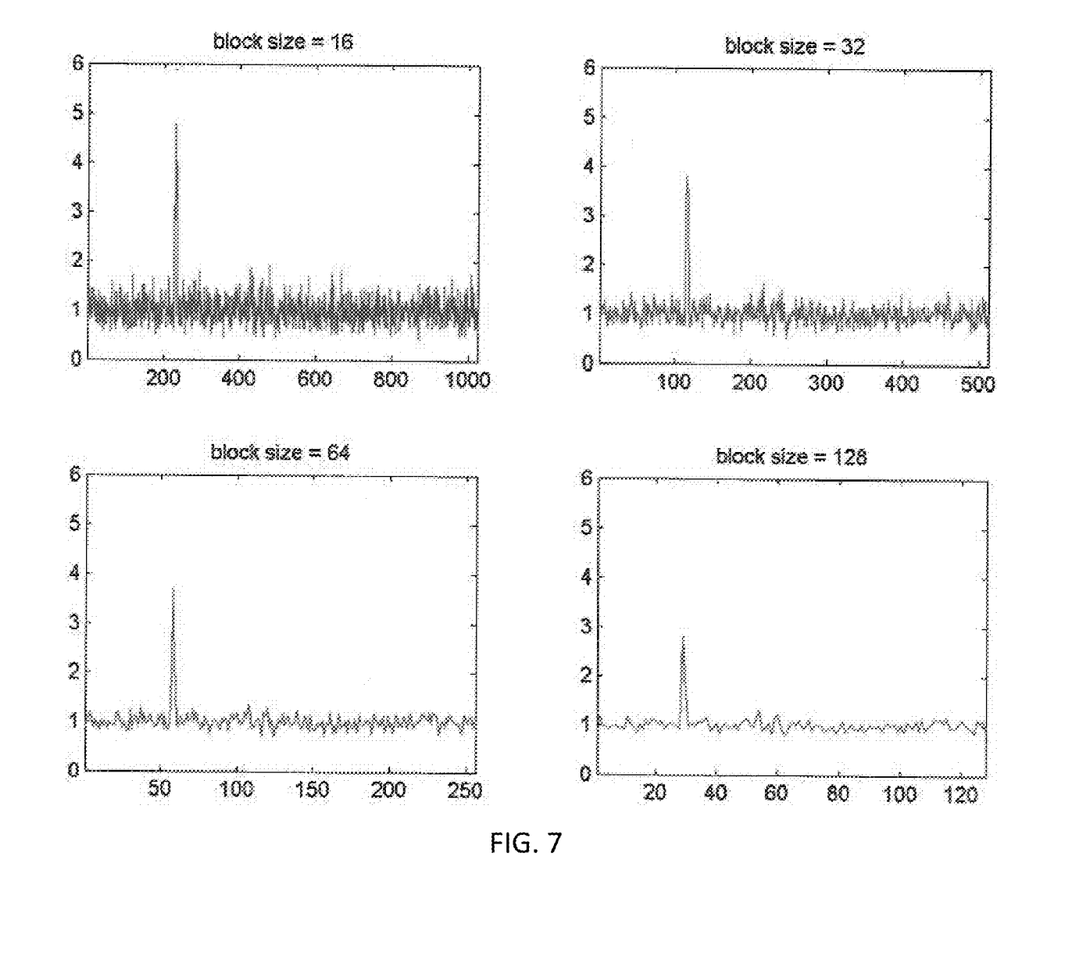
FIG. 7 is a graph of average power versus sample group four each of the simulated sample groups.

FIG. 7 illustrates the averaged power of each of the four sample groups. The variance of each sample group is smaller for larger sample group sizes. Accordingly, a threshold may be set lower for larger block sizes without increasing the number of false alarms. Adaptive threshold settings may also be used if there is a-priori information about the extent of the chaff cloud range.

Figure 8:
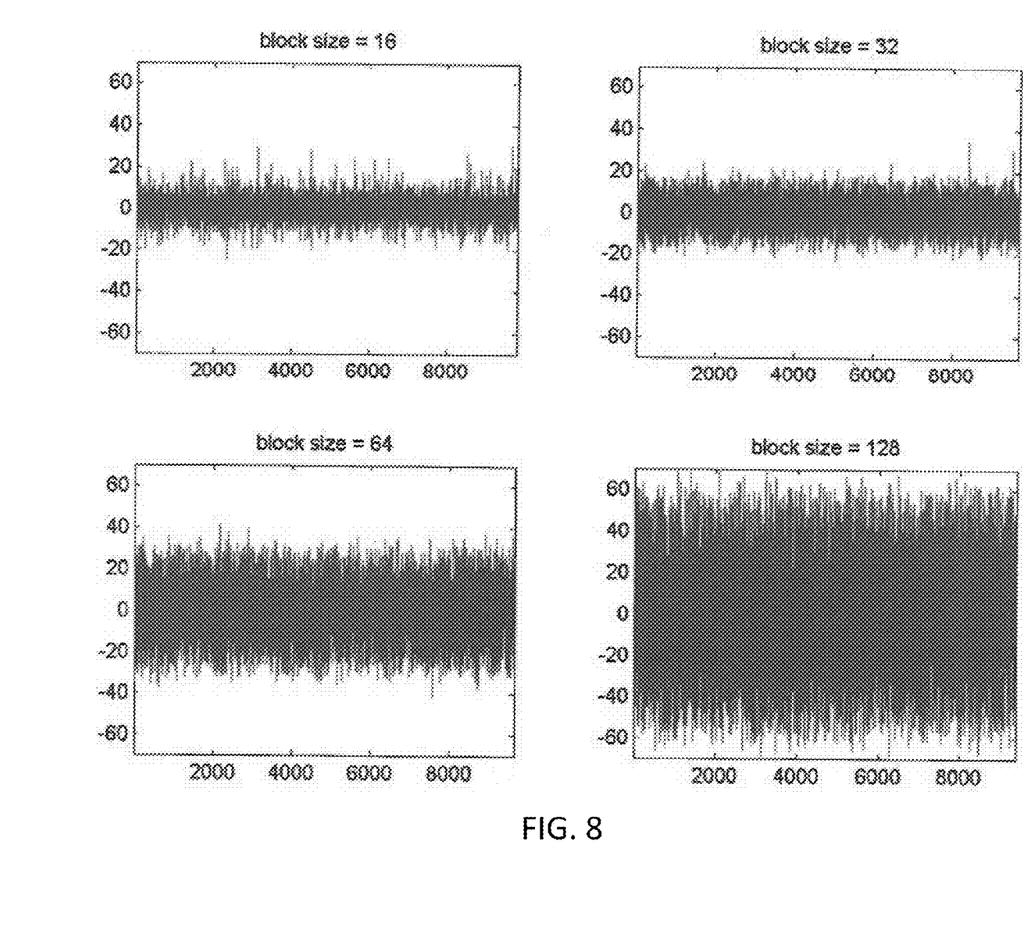
FIG. 8 illustrates the estimated chaff centroid error in equivalent sample groups for the 10,000 simulations for each of the four simulated sample groups.

FIG. 8 illustrates the estimated chaff centroid error in a number of samples for the 10,000 simulations for each of the four sample group sizes. As shown in FIG. 8, the errors are larger for samples groups having more samples per group. Conversely, the errors are comparatively small for sample group sizes having fewer samples per group. This is because of uncertainty in centroid estimation for any block size is one-half of the block size.

Figure 9:
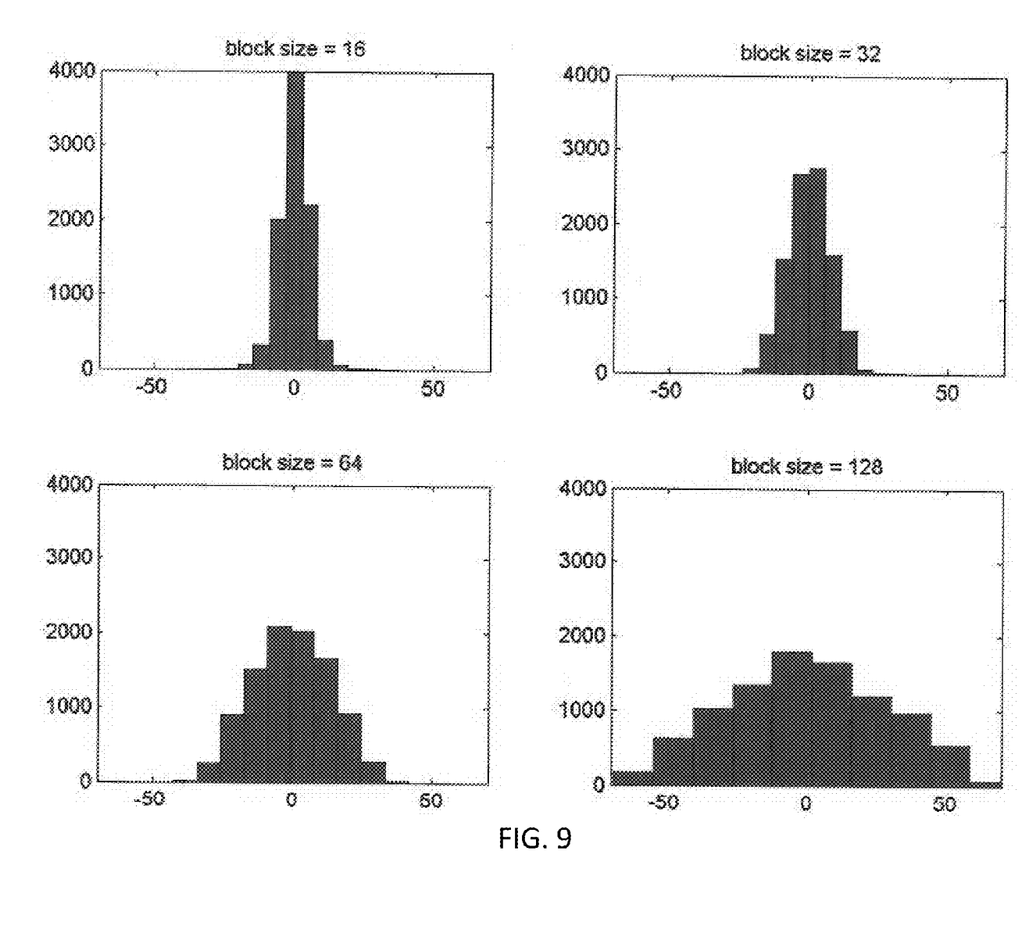
FIG. 9 illustrates histograms or the probability density functions (PDFs) of centroid estimation errors for all 10,000 simulations.

The histograms or the probability density functions (PDFs) of centroid estimation errors for all 10,000 simulations are illustrated in FIG. 9. As shown in FIG. 9, the PDFs follow a Gaussian distribution. A false alarm occurs when there is a detection due to noise, not because of chaff. A missed detection occurs when there no detection even though chaff is present. Thresholds are selected for various block sizes such that a constant false alarm probability is achieved. However, a slight deviation from this constant false alarm rate is expected because of random location of chaff in range and its statistical fluctuations. As these false alarms occur at different range locations for different block sizes, overall false alarm probability of chaff can be reduced by increasing the value of M in M/N detection. The simulations resulted in eleven false alarms for M=1, compared to zero false alarms for M=4. Accordingly, the M out of N detection scheme provides a compromise between probability of false alarm and probability of detection. Table 2, below, shows the M/N detection statistics for 10,000 Monte Carlo simulations.

TABLE 2

| M | N | Number of Detections | $P_d$ | Number of False Alarms |
|---|---|---|---|---|
| 1 | 4 | 9869 | 0.99 | 11 |
| 2 | 4 | 9736 | 0.97 | 5 |
| 3 | 4 | 9612 | 0.96 | 1 |
| 4 | 4 | 9334 | 0.93 | 0 |

As shown in Table 2, the number of false alarms approaches zero as M approaches N, but the overall probability of detection decreases.

The disclosed system and method may be embodied in the form of computer-implemented processes and apparatus for practicing those processes. The disclosed system and method may also be embodied in the form of computer program code embodied in tangible machine readable storage media, such as random access memory (RAM), floppy diskettes, read only memories (ROMs), CD-ROMs, hard disk drives, flash memories, or any other machine-readable storage medium, wherein, when the computer program code is loaded into and executed by a computer, the computer becomes an apparatus for practicing the method. The system and method may also be embodied in the form of computer program code loaded into and/or executed by a computer, such that, when the computer program code is loaded into and executed by a computer, the computer becomes an apparatus for practicing the method. When implemented on a general-purpose processor, the computer program code segments configure the processor to create specific logic circuits. The disclosed system and method may alternatively be embodied in a digital signal processor formed of application specific integrated circuits for performing a method according to the principles described herein.

Although the disclosed system and method have been described in terms of exemplary embodiments, it is not limited thereto. Rather, the appended claims should be construed broadly, to include other variants and embodiments of the disclosed system and method, which may be made by those skilled in the art without departing from the scope and range of equivalents.

What is claimed is:

1. A method for detecting chaff for a radar system, the method comprising:
   a) receiving range profile data including a plurality of samples from a radar system;
   b) determining an average power for a first group of samples of the range profile data and for a second group of samples of the range profile data in a computer-implemented process;

c) comparing the average power for the first group of samples to a first threshold value and the average power for the second group of samples to a second threshold value in a computer-implemented process; and d) identifying a chaff detection if an average power of at least one of the first and second groups of samples exceeds its respective threshold value.

2. The method of claim 1, wherein the first group of samples includes more samples than the second group of samples.

3. The method of claim 2, wherein the first threshold value is greater than the second threshold value.

4. The method of claim 1, further comprising:

e) determining an average power for a third group of samples; and f) comparing the average power of the third group of samples to a third threshold value, wherein step d) includes identifying chaff detection if an average power of at least one of the first, second, and third groups of samples exceeds their respective threshold values.

5. The method of claim 1, wherein step b) includes:

i) determining an average power for each of a first plurality of sample groups each having a first number of samples per sample group, and ii) determining an average power for each of a second plurality of sample groups each having a second number of samples per sample group.

6. The method of claim 5, wherein step c) includes:

i) comparing the average power for each of the first plurality of sample groups to the first threshold value, and ii) comparing the average power for each of the second plurality of sample groups to the second threshold value.

7. The method of claim 6, wherein step d) includes identifying a chaff detection if a number of the first, second, and third pluralities of sample groups includes at least one of their respective sample groups having an average power that exceeds its respective threshold value.

8. The method of claim 1, further comprising:

f) identifying a centroid of the chaff.

9. A system for detecting a chaff cloud, comprising:

computer readable storage medium; and a processor in signal communication with the computer readable storage medium, the processor configured to:

receive range profile data including a plurality of samples from a radar system;

determine an average power for first group of samples of the range profile data and a second group of samples of the range profile data;

compare the average power for the first group of samples to a first threshold value and the average power for the second group of samples to a second threshold value; and detect the chaff cloud if an average power of at least one of the first and second groups of samples exceeds its respective threshold value.

10. The system of claim 9, wherein the processor is configured to:

determine an average power for a third group of samples;

compare the average power of the third group of samples to a third threshold value; and identify chaff detection if an average power of at least one of the first, second, and third groups of samples exceeds their respective threshold values.

11. The system of claim 9, wherein the processor is configured to:

determine an average power for each of a first plurality of sample groups each having a first number of samples per sample group;

determine an average power for each of a second plurality of sample groups each having a second number of samples per sample group;

compare the average power for each of the first plurality of sample groups to the first threshold value;

compare the average power for each of the second plurality of sample groups to the second threshold value; and identify a chaff detection if at least one of the first, second, and third pluralities of sample groups includes at least one of their respective sample groups having an average power that exceeds its respective threshold value.

12. The system of claim 9, wherein the processor is configured to identify a centroid of chaff.

13. A non-transitory computer readable storage medium encoded with computer program code, such that when the computer program code is executed by a processor, the processor performs a method comprising:

a) receiving range profile data including a plurality of samples from a radar system;

b) determining an average power for a first group of samples of the range profile data and a second group of samples of the range profile data;

c) comparing the average power for the first group of samples to a first threshold value and the average power for the second group of samples to a second threshold value; and d) identifying a chaff detection if an average power of at least one of the first and second groups of samples exceeds its respective threshold value.

14. The non-transitory computer readable storage medium of claim 13, the method further comprising:

e) determining an average power for a third group of samples; and f) comparing the average power of the third group of samples to a third threshold value, wherein step d) includes identifying chaff detection if an average power of at least one of the first, second, and third groups of samples exceeds their respective threshold values.

15. The non-transitory computer readable storage medium of claim 13, wherein step b) includes:

i) determining an average power for each of a first plurality of sample groups each having a first number of samples per sample group, and ii) determining an average power for each of a second plurality of sample groups each having a second number of samples per sample group.

16. The non-transitory computer readable storage medium of claim 15, wherein step c) includes:

i) comparing the average power for each of the first plurality of sample groups to the first threshold value, and ii) comparing the average power for each of the second plurality of sample groups to the second threshold value.

17. The non-transitory computer readable storage medium of claim 16, wherein step d) includes identifying a chaff detection if at least one of the first, second, and third pluralities of sample groups includes at least one of their respective sample groups having an average power that exceeds its respective threshold value.

18. The non-transitory computer readable storage medium of claim 13, the method further comprising:

f) identifying a centroid of the chaff.

19. A method for identifying a chaff cloud, comprising:

receiving range profile data including a plurality of samples from a radar system;

replicating range profile data to provide a plurality of range profile data sets;

for each of the range profile data sets,
- dividing the samples of the range profile data into a plurality of groups, each group of samples in a data set having an approximately equal number of samples per group,
- determining an average power of each of the sample groups,
- comparing the average power of each of the samples groups to a threshold value,
- identifying an initial detection of chaff if the average power of a sample group exceeds the threshold value; and identifying a chaff cloud if at least one of the range profile data sets identifies at least one initial detection of chaff.

20. The method of claim 19, further comprising:
determining an extent and a centroid of the chaff cloud.

\* \* \* \* \*